Nov. 15, 1966 P. E. DINKEL 3,284,980
HYDRAULIC CEMENT PANEL WITH LOW DENSITY CORE AND
FIBER REINFORCED HIGH DENSITY SURFACE LAYERS
Filed July 15, 1964 2 Sheets-Sheet 1

PAUL E. DINKEL
INVENTOR.

BY John W. Teare
ATTORNEY

Nov. 15, 1966 P. E. DINKEL 3,284,980
HYDRAULIC CEMENT PANEL WITH LOW DENSITY CORE AND
FIBER REINFORCED HIGH DENSITY SURFACE LAYERS
Filed July 15, 1964 2 Sheets-Sheet 2

INVENTOR.
Paul E. Dinkel
BY John W. Teare

3,284,980
HYDRAULIC CEMENT PANEL WITH LOW DENSITY CORE AND FIBER REINFORCED HIGH DENSITY SURFACE LAYERS
Paul E. Dinkel, 459 N. D St., Hamilton, Ohio
Filed July 15, 1964, Ser. No. 384,043
10 Claims. (Cl. 52—600)

This application is a continuation-in-part of my copending application, Serial No. 219,419, filed August 27, 1962, and now abandoned.

This invention relates to a structural panel suitable for use in construction of walls and the like particularly where high moisture conditions are encountered. More particularly the invention relates to a precast panel of cement and aggregate preferably the lightweight type, and reinforced with a skin membrane of fibrous material. Another aspect of the invention relates to a method of using a structural panel of prefabricated nature.

In the construction of building walls extensive use is made of preformed panels or sheets such as fiberboard, plasterboard, foamed plastic-paper laminates, and concrete. For example, large amounts of rock lath are utilized as a base for a plastered wall; the sheets are nailed or fastened by other means to the studding and subsequently plastered. In a less expensive and more rapid method of building, certain types of plasterboard are employed in so-called "dry wall" construction; after the panels are attached to the framing, the joints are then taped, filled and smoothed, ready for painting.

In other phases of building construction a much more waterproof and durable type of panel is required; for example, in the construction of exterior walls of non-residential structures, after the steel or other type of framing is erected, curtain walls are formed by attaching various types of panels such as metal or glass units.

Molded panels of concrete have not found wide use on vertical portions of buildings (although employed as floor base and roof decks) because of their considerable weight and their poor flexural strength in thin sections. There exists a considerable need for thin, lightweight, strong, waterproof panels of molded concrete. Waterproofness is important on such exterior applications in order to prevent weathering or erosion, in order to prevent transmission of moisture and in order to provide a base to which other panels, facing, signs, or the like can be attached without being affected by moisture, freezing or the like which would weaken the bond between the base and anything attached thereto.

Concrete affords excellent opportunities because of the low cost of the ingredients, and its low pickup and low transmission of moisture and water. However, concrete, in thin sections, when not reinforced, is brittle and cannot be handled readily in thin panels without substantial breakage. If a workman attempts to lift a concrete panel which is 1″ x 2′ x 6′ picking up one end, the panel will break into pieces.

In yet another area of construction, there is a real and subtsantial need for a precast, lightweight, strong concrete panel. The conditions which exist around a shower enclosure and bathtub walls call for a panel that is not adversely affected by moisture. Ordinary panels such as, for example, those used in dry wall, gypsum board construction, are not sufficiently resistant to moisture to permit successful use. Ceramic tile mounted upon such, even though well grouted, will in short time come loose and the gypsum board will disintegrate, due to penetration of moisture. Also where the backing for the tile comprises ordinary plaster, the moisture from the tub or shower area will be taken up by the plaster and disintegrate, causing it to weaken and permitting the tiles to come loose.

Because of these difficulties due to moisture, in bathrooms, shower areas, kitchens or other areas where water is present, at least at times, it is necessary in constructing the walls to use a concrete base or other special treatment. In the typical bathroom enclosure construction, metal lath is first applied over the studding. A scratch coat of Portland cement plaster, is then applied and then after this is properly set another layer, that is the ground coat, of Portland cement plaster is applied. These steps must first be completed before the tile can be installed. As a result the preparation work is excessive, strenuous, time consuming and the workman must frequently make two or three trips to the job before tile can be installed.

My invention comprises a precast thin, strong, flexible concrete panel that can be employed with a high degree of success in construction of shower enclosures, bathroom walls, bathroom floors, curtain walls, swimming pools and surrounding areas, and the like which may be exposed to moisture. In particular my panel is useful as a base for setting ceramic tile and the like. It is strong and lightweight so that it can be handled by workmen without danger of breaking. It can be sawed and is nailable so that it can be readily put up in place for wall construction. Thus where an enclosure around a shower or bathroom is to be tiled, these panels can be nailed in place and ready for application of the thin set mortar (used as a bonding agent for ceramic tile) and or mastic (used as a bonding agent for ceramic tile) and installation of the tile, within twenty minutes to an hour after the workman arrives on the job. In the conventional method where the scratch coat and ground coat must be applied in separate layers, it may be hours or days before the area is ready for the actual tile installation. Thus a considerable savings in labor and in cost of construction can be achieved by virtue of my precast panel.

The panels required for such construction in order to provide the lightest weight and minimize the load on the building should be fairly thin. For example, panels from ½″ to 1″ thick are typical of those normally required. Lightweight is also necessary in order to permit ease of handling panels of large size by the workman.

The product of this invention is best exemplified by a precast concrete panel consisting of five unified, cooperative layers or elements; (1) a thin surface layer of a hydraulic cement, neat or containing up to approximately an equal amount of fine aggregate, (2) a pervious layer of high strength non-water-susceptible fiber (such as mesh), embedded in layer (1) at or immediately beneath its surface, and having its openings filled thereby, (3) a core layer of lightweight concrete containing hydraulic cement and lightweight aggregate having a substantial portion of its volume constituted by voids or openings, (4) a second layer similar to (2) of either the same fiber or another of the same group of fibers, and (5) a second surface layer similar to (1) of the same hydraulic cement or one of the same group. The hydraulic cement layers (1) and (4) not only penetrate the layers of fiber but also penetrate and fill the irregularities in the facial boundary of the core as is more fully described later in the specification.

In the preferred embodiment of my invention the precast panel is formed with a core of lightweight aggregate and Portland cement and is covered on each of the two principal surfaces with a skin membrane of glass fiber mesh bonded to the core with a slurry containing Portland cement.

The object of the invention is to provide an inexpensive lightweight concrete panel that can be handled as any other building panel.

Other objects, advantages and features will become apparent from the following detailed description wherein particular embodiments of the invention are described, being illustrated in the accompanying drawings, in which FIG. 1 is a partially cutaway front view of a rectangular panel showing the five-layer structure.

FIG. 5 is a cross section of a portion of a panel showing in more detail the nature of the multi-layered structure.

Figure 1:
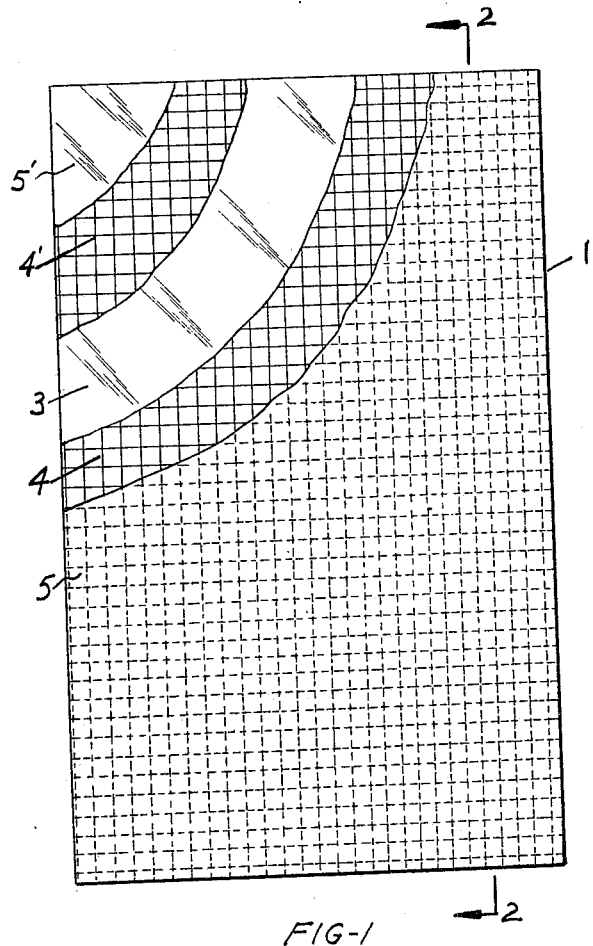
Figure 2:
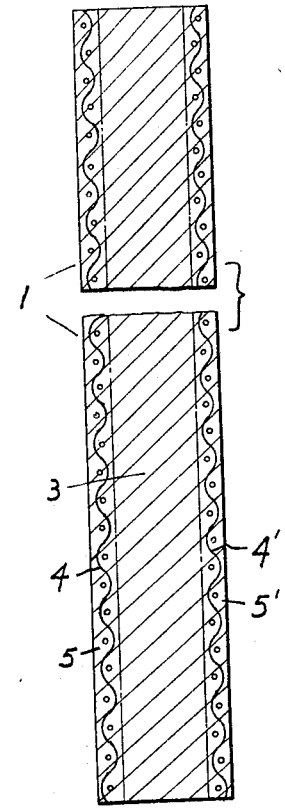
FIG. 2 is a stylized cross section through line 2—2 of FIG. 1 somewhat enlarged.

In the accompanying drawings 1 represents a precast concrete panel having a core 3 covered on its two opposing major surfaces by fiber layers 4 and 4'. Each fiber layer is strongly bonded to the core by a light layer 5 of bonding agent, sufficient to penetrate the interstices in the fiber layer and at least lightly cover the layer and also to provide intimate contact with the core. In FIG. 2 the thickness of the mesh 4 and also the thickness of the layer 5 of bonding agent is substantially enlarged for purposes of illustration; actually both are quite thin compared to the core. For example, a typical mesh layer such as woven glass fiber is approximately 0.0125 inch thick. The amount of mortar applied is such as to fill the interstices between the fibers or strands or mesh of the fiber layer and to cover the membrane so as to properly bond it to the core. Each and every strand need not necessarily be covered although normally they are all lightly covered.

Thus, in the preferred construction the bonding layer at each side of the panel extends from the outer face of the mesh layer at that side, through the mesh layer and into bonded engagement with the core, filling voids, openings or surface irregularities of the latter to unify the entire panel into a relatively thin integrated panel structure of high strength and light weight possessing high durabiilty in resistance to moisture.

The preferred embodiment uses for the skin membrane 4, 4', a glass fiber mesh coated with a vinyl resin, such as is presently supplied by the Owens-Corning Fiberglas Corporation as screening. Further and alternative fibrous materials are set forth elsewhere in the specification.

Figure 3:
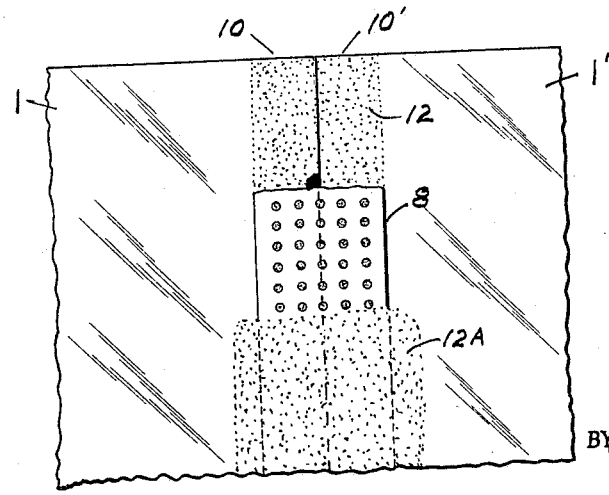
FIG. 3 is a partially cutaway front view of a taped joint between adjacent panels.
Figure 3:
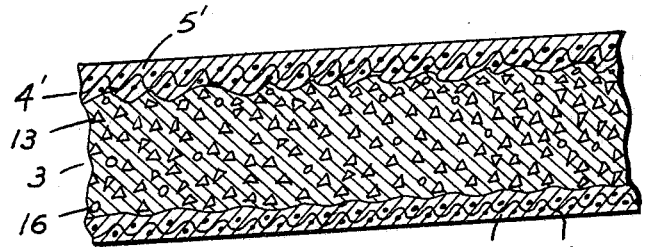

FIG. 3 illustrates a joint between adjacent panels 1, 1' wherein a joint reinforcing means such as an elongated strip of tape 8 or of mesh 9 overlies and straddles the adjacent edges 10, 10' of the panels. The mesh may be an elongated strip of the same material used for the mesh 4, 4' in the skin layer of the panel. The joint is completed by filling the space between the panels and the mesh openings with thin set mortar such as used to bond the ceramic tile to the panel. Preferably a layer of the thin set mortar is arranged to cover the reinforcing means, as shown as 12A in FIG. 3.

Figure 4:
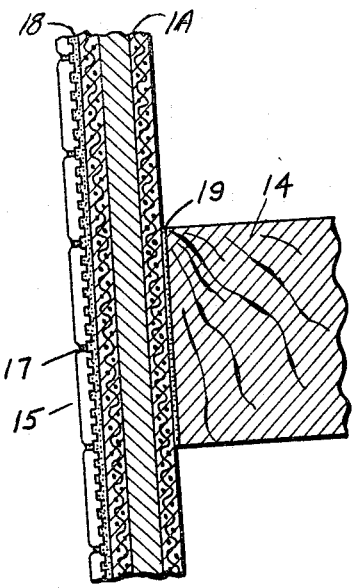
FIG. 4 is a top view showing one manner of fastening the panel to a wood frame where tiles have been previously cemented to the panel.
Figure 6:
FIGS. 6 through 11 illustrate the manner of precasting my panel.
Figure 7:
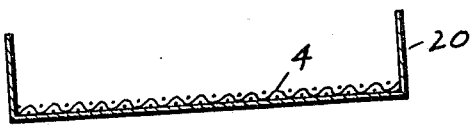
Figure 8:
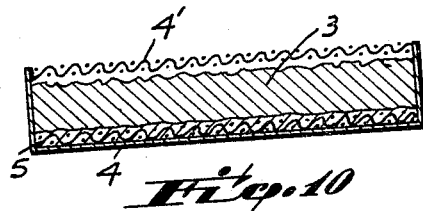

In FIG. 4 a prefabricated panel 1A is provided, having a layer of tiles 15 already attached with thin set cement 18 and grout 17. The panel is attached to the structure (represented by the stud 14) by a layer 19 of any commercially available adhesive material such as epoxy resin cement. In this fashion the asthetic value of the panel 1A is preserved. Adjacent panels are connected in any suitable fashion, for example the edges of adjacent panels can be connected as illustrated in FIG. 3 whereby a single tile can overlay the joint, in which case the prefixed tiles are spaced about one-half a tile width from the edge of the adjoining panels.

The core 3 is lightweight concrete made up of lightweight aggregate 13 and hydraulic cement. Such aggregates, exemplified by perlite and expanded slag, are cellular in nature, some of the cells being closed and some open; the proportion of cells varies with the different materials. As another means of reducing unit weight air-entraining cement is used. Vibrating or tamping is used only sparingly and in most cases not at all. The core thus contains a number of voids and openings indicated at 16. For a core of low unit weight (as an example, 40 to 70 pounds per cubic foot) both the openings between the aggregate particles (including entrained air) and the multitude of cells in the aggregate particles will contribute to the low density. At higher densities there will be fewer cells in the aggregate and fewer openings (voids) between the particles in the core.

In addition to use of lightweight aggregate and entrained air, the ratio of cement to aggregate desirably is controlled, i.e., the concrete mix is kept on the lean side, as compared to the bonding layer. The core mix for example, should contain at least two parts by volume of aggregate to each volume of hydraulic cement; preferably the mix should be 3:1 or 4:1. If the ratio of aggregate to hydraulic cement is less than 2:1 the core becomes dense and hard; it is no longer nailable.

Cores having a unit weight not substantially exceeding approximately 120 to 130 pounds per cubic foot are suitable for my panel; best results are derived with cores in the range of 40 pounds to 110 pounds per cubic foot. In this weight range the panels are practical to handle in construction and the panels can be nailed easily without breaking even where nailing adjacent an edge is necessary. Such core slabs without unification with the cooperative layers are quite weak and incapable of self support; for example, a one inch thick slab four feet long, could not be picked up from one end without breaking.

The production of the panels is shown step by step in FIGS. 6 through 11. Into a form 20 of a size of the desired panel, a layer of fibrous material 4 is laid. A slurry containing hydraulic cement and of suitable consistency to permit penetration thereof through the openings in the fibrous layer 4 (shown as a woven mesh) is applied, as from the traveling supply pipe 21. The amount of cement slurry introduced is sufficient to cover the fibrous layer completely so that substantially all the fibers are immersed or embedded; the slurry penetrates the openings in the fibrous layer and fills them so that the layer is enveloped on both sides. Normally this is only a light envelopment although an excess is sometimes needed where the aggregate in the core is large and the boundary surface presented by the core is very rough.

Figure 9:
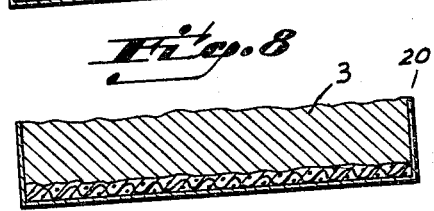

In the next step the core mixture of aggregate and hydraulic cement is poured into the form; the water content is normally kept on the low side within the range for best strength development in the concrete. A typical mix is three volumes of lightweight aggregate, one volume Portland cement and three-fourths volume of water. The core mix is then rodded off flush with the top of the form, as shown in FIG. 9; at the top boundary of the core some depressions will usually be present due to the openings between aggregate particles, to voids from the air entrainment or other cause, resulting from the coarse nature of the core composition.

Figure 10:
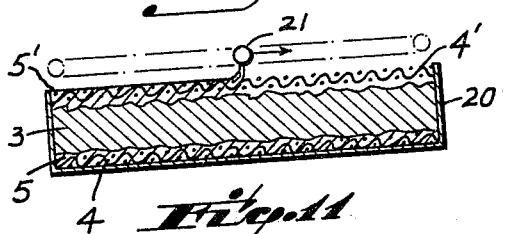
Figure 11:

A layer of fibrous material 4' is laid over the top as the next step, FIG. 10. In actual practice the upper surface of core 3 is flush with the top edges of form 20, and not recessed as shown in FIG. 10. The thickness of the fiber layer 4' ordinarily is so slight that it does not add materially to the thickness of the core.

The last layer 5' of hydraulic cement slurry is poured over the fiber layer 4' from traveling supply pipe 21, or applied by other suitable means. The slurry penetrates the openings in the fibrous layer and also into the voids, openings or surface irregularities at the upper boundary surface of core 3. Sufficient slurry is deposited to penetrate and fill the openings and voids in the core surface, to fill the openings in the fibrous layer and to lightly cover the fibrous layer, or at least be flush with its outer surface; it is then rodded or otherwise leveled off. The fibrous layer is normally kept as close to the ultimate surface of the finished panel as possible inasmuch as the maximum benefit and greatest strength is thereby realized from the fibers.

After the composite panel is prepared it is left in the form 20 for sufficient time to effect initial cure, or complete cure if desired; the use of a plastic film covering to retain moisture or the use of steam curing is advantageous.

FIG. 5 shows further details; the core contains openings (voids) 16 as well as lightweight aggregate 13. Both layers 5' and 5 are quite thin relative to the core (although exaggerated in FIG. 5). Of the two the top layer 5' is somewhat thicker; due to gravity the fluids in the core mix tend to drain away from the top surface of core 3 leaving openings and depressions. Hence slightly more slurry is needed to form the layer 5' than layer 5. The aggregate particles on the bottom will tend to conform to the bonding layer 5, under the weight of the core and other layers.

The lightweight core of itself is inadequate to bond the re-inforcing fibrous layers sufficiently to form an integral structure. Thus, the concrete mixes employed to gain low density, nailability and other desirable characteristics do not afford means for bonding. While the core mixes employed are in the range of conventional concretes (that is, at least 2 volumes of aggregate to one volume of hydraulic cement) such mixes are so lean in cement for purposes of bonding surface webs that even though the fibrous layers 5 and 5' are pressed into intimate contact with the core, this is not sufficient. The areas of contact are generally so limited that the bond between the two is poor; also, in such a case, after curing the fibrous layers tend to de-laminate very readily and will not provide the necessary support for the core.

The strong structure of the present invention, by way of comparison, is further understood from a study of FIG. 5. The aggregate particles tend to protrude outward from the boundary surfaces of the core presenting peaks or high spots. Contact of the fibrous layer with the core thus is limited to small areas at these points. This limited contact, plus the fact that the cement present is tied up in aggregate-to-aggregate bonding, precludes adequate bonding of the fibrous layers by the core mix itself. However, I have found that the fibrous layers can be effectively cemented to and fully integrated with the core by use of a hydraulic cement slurry relatively rich in cement. While such cement is of relatively high density, in and of itself, the amount required to fill the mesh openings as well as the core openings or surface irregularities is, relatively, so small that the desired overall low weight of the panel is obtained. The finished panel resembles an I-beam with the core serving as a spacer rib and the two bonded fibrous layers functioning as the web members to accommodate tension and compression forces. The slurries employed are rich in cement relative to the core; neat cement is preferred but mixtures containing very fine aggregate, up to 50% by volume, are very suitable. Fineness of the aggregate must be such as to permit the slurry to penetrate the openings of the fibrous layer.

The bonding layer rich in cement not only serves to tenaciously bond the fibrous layer to the core, but also in combination with the fibrous layer provides a hard, durable, wear-resistant surface for the panel. The composite surface functions well to receive ceramic tile, paint or other surface coverings; it also serves to protect the core and permits use of the panel as a weatherproof exterior panel such as in construction of curtain walls, swimming pools and the like.

The five-layered membered panel is further characterized by five density zones; or three density zones in the sense that since the bonding layers 5 and 5' are generally the same or of equivalent structure, while the same fiber layer is normally used at 4 and 4' although not limited to such. Thus, the surface layer is of relatively high density; the hydraulic cement layers 5 and 5', either neat or containing some very fine aggregate (such as fine sand or fine expanded slag) usually have a unit weight ranging between 110 pounds per cubic foot and 145 pounds per cubic foot; for certain mixes the weight may be slightly less.

The material in the fibrous layers 2 and 4 ranges between a specific gravity of 1.14 for nylon, 2.55 for glass fibers, 2.7 for aluminum, through 7.5 for steel. Since the fibrous layer normally is a woven mesh or of similar make-up and the thickness used is very low (for example, 0.0125) its density is not critical. Specific gravity will be dependent upon the high strength non-water-susceptible fiber employed.

The core layer as previously described comprises a low density concrete having a unit weight between 40 and 110 pounds per cubic foot, preferred range.

In order to afford nailability the type of lightweight aggregate and the ratio of cement to aggregate are interrelated. Where a weak material such as expanded perlite or vermiculite is employed, the ratio of cement to aggregate may be as high as 1:2. A rich mix is desirable in order that the cement offsets the loss in strength that otherwise would be suffered because of the low strength of the aggregate. Where the aggregate is relatively strong, for example, expanded cellular blast furnace slag, less cement may and preferably should be employed. A ratio of 1 part cement to 2 parts of such slag aggregate produces a panel which is relatively dense, and on the border line for nailability. With the slag aggregate the ratio can be as low as 1:6; however with a leaner mix than this panel will be too low in strength. Preferred range is between 1:2 and 1:4.

Air entraining cements, as well as conventional cement are desirable since they assist in achieving low density while retaining adequate strength.

My panel thus comprises a surface layer on the opposed faces rich in cement and of high strength, yet relatively thin, whereas the core is relatively low in cement, low in density and readily penetrable by nails, screws and other fasteners. While the surface layer is strong and hard, its thinness permits a nail to be driven through the panel without pre-drilling and without breaking, even when nailed almost at the very edge. In a typical precast panel ¾ inch thick, the bottom layer will average ¹⁄₃₂ inch thick, while the upper surface layer will be ¹⁄₁₆ inch to ⅛ inch on the average. In contrast the core mix comprises the balance of the thickness, by far the major portion. My wall panels can be produced in varying thickness depending upon end use; ¼″, ⅜″, ½″, ¾″ and 1″ are representative thicknesses. For flooring, roof deck and other applications considerably thicker panels are formed, for example, 2″ thick.

A unique combination is employed in my panel; a core of lightweight cellular materials and hydraulic cement with voids and openings present, of low density and only moderate strength, bounded on each of its two major faces by high-strength fibrous material, effectively bonded to the core by a relatively high density layer of hydraulic cement which extends through the interstices of the fibrous layers and into intimate contact with core, penetrating the voids and openings present in the surface of the core. The results is a multiple-ply monolithic structural panel in which the sole cementitious bonding agent is hydraulic cement.

By this combination I have produced a novel structure, a commercially successful precast concrete panel which is both lightweight (specific gravity between about 1.1 and 1.8) and high in strength. Furthermore, the panel is not adversely affected by water and can be used in wet environments, including exterior application. It is completely non-flammable.

While the invention has been described with respect to substantially flat panels for use as inside building walls, other embodiments and uses are comprehended. For example, curved corner members, and other shapes, with or without ceramic tile are contemplated, as are prefabricated structures such as shower stalls, vanitories, telephone booths, patio blocks, waterproof membranes under toilets to take the place of marble slabs and stainless steel sheets now used in bathrooms, and so forth. Also the panels can be used outside to construct swimming pools using if desired ceramic tile and/or synthetic resin, such as epoxy resin coatings, as surfaces for beauty and/or waterproofing.

My invention is further illustrated by the following examples.

Example I

A precast panel 36" wide, 64" long and ½" thick, was formed as follows. Into a form 36" x 64" x ½", lined with polyethylene film is first placed a 36" x 64" sheet of 8 x 8 mesh woven glass fiber screen. Over this was applied a thin slurry of Portland cement and fine (minus 25 mesh) expanded blast furnace slag aggregate ("Amlite" sold by the American Materials Corp.) in the ratio of one part by volume of Portland cement and one part by volume of fine aggregate. Only sufficient of this bonding slurry was applied to cover the layer of glass fiber and to fill the interstices. Over this was poured sufficient wet mix concrete to fill the form. The mix comprised 25 parts by weight of cellular aggregate formed from blast furnace slag ("Amlite"), 4 parts by weight of perlite, 15 parts by weight Portland cement and sufficient water about 12 parts by weight) to provide adequate working properties. The excess concrete mix was rodded off to the level of the form to give a smooth surface. Over this was laid another 36" x 64" section of 8 x 8 mesh woven glass fiber. A layer of the same bonding agent, Portland cement and fine expanded slag aggregate slurry, was applied in sufficient amount to completely cover the glass fiber and fill in the interstices. A layer of polyethylene film was laid over the surface for purposes of holding the moisture. After curing for 24 hours the panel was removed from the form and carried without danger of cracking.

Panels prepared in the above manner are especially suitable for the construction of an enclosure around a bathtub. The panels may be cut by scoring with a knife to cut through the fibrous skin membrane and broken at the score line, then severing the other membrane. These panels break cleanly at the score, requiring no sawing, although they may be sawed readily as with a coarse abrasive wheel. The panels are then nailed in place on the studding. A 2" tape of glass fiber mesh may be applied in the joints between the abutting panels and a thin slurry of "thin set Portland cement" applied to cover the glass fiber tape and bond it in place. The thin set cement mortar is described in detail in U.S. Patent 2,820,713; this was developed by the Tile Council of America and is now extensively used for the installation of ceramic tile and the like. For example, within one hour after starting to cut the precast reinforced panels, the enclosure was ready for the next operation. Ceramic tile was applied with thin set Portland cement mortar. In a representative installation after several months of use there was not indication of loosening of the tile from the wall or break down of the panel itself as tested by manually pounding the wall. The glass fiber mesh used was woven screening made from glass fiber yarns coated with polyvinyl chloride resin, manufactured by Owens-Corning Fiberglas Corporation.

The cured 36" x 64" x ½" panel weighed approximately 57 pounds; actual thickness after curing was somewhat less than ½ inch. The two sheets of glass fiber incorporated weighed in total 0.56 pound, or about 1%.

In normal manufacture by the method heretofore described the panel after curing more than a week has a compressive strength in the range of 860 to 1250 p.s.i., tensile strength on the average of 328 p.s.i. and flexural strength between 900 and 1100 p.s.i. Specific gravity of the panel was 1.4 (87.5 lbs./cu. ft.) after 28 days days curing. During production of the panel some of the core mix was separately poured to form a test block; also a test block was poured of the bonding agent. The core mix had a unit weight of 69 lbs./cu. ft. and the bonding agent a unit weight of 125 lbs./cu. ft. both after 28 days curing. A test section of the panel when subjected to the moisture stability test for 580 hours had about a 10% gain in weight; there was no dimensional change. It was not affected when subjected to freezing tests. The coefficient of linear thermal expansion was found to be $2.4 \times 10^{-5}$, average value.

Example II

A concrete panel 24" wide and 36" long was prepared in the same manner as the panel in Example I. In this case, however the reinforcing membrane was a woven saran fabric 18 x 14 mesh. The surface bonding material and the concrete slurry used for the core were the same as in Example I. The cured panel had a high strength and showed no resistance to cracking or breaking when handled such as by lifting from one end.

Example III

A panel was formed by the same procedure described in Example I but in this case was 1" thick. Accordingly the jig or form had a 1" depth instead of ½". Mesh was 18 x 14. The slurry in this case for bonding the glass-fiber mesh comprised one bucket of dry Portland cement and one bucket of fine (minus 16 sieve) cellular aggregate from blast furnace slag (Amlite). The slurry for the core in this case was a 4:1 mix prepared in the ratio of one bucket Amlite (damp but free flowing), one bucket perlite, one-half bucket Portland cement and one-half bucket water. Specific gravity of a section of the panel was 1.4 (88 lbs./cu. ft.); the core mix test block weighed 70 lbs./cu. ft. while the bonding agent test block weighed 125 lbs./cu. ft., all after 28 days curing.

A child's swimming pool 6' x 8' x 18" was formed by excavating the earth to a suitable depth. The bottom was then filled with sand and leveled. Panels made according to this Example III were laid as a flooring, and others were cut to form the side walls. The joints were then taped with glass fiber 18 x 14 mesh and bonded in place with a layer of thin set Portland cement mortar applied in sufficient quantity to fill in the interstices and completely cover the mesh. This swimming pool showed no signs of water loss, cracking or sluffing off of the surface when filled with water and used as a swimming pool for children without emptying for more than two months.

Example IV

A panel ½" x 36" x 64" was formed according to the procedure described in Example I, except for the following details. The reinforcing membrane for both surfaces was an 18 x 14 mesh, vinyl coated glass fiber screening (Fiberglas from Owens-Corning Fiberglas Corp.). The core mix was made up in the proportion of 3 buckets of expanded cellular aggregate from blast furnace slag ("Amlite" supplied by American Materials Corp.), 1 bucket of air entraining type Portland cement, ½ bucket of lime and about ¾ bucket of water. The slurry employed to bond the membrane was prepared from Portland cement and Amlite (minus 25 mesh) in the ratio of one bucket to one bucket. After curing one week it withstood the weight of two men (totaling more than 300 pounds) resting on supports 20" apart. The panel weighed about 70 pounds; the glass fiber incorporated weighed about 1½ pounds.

Example V

A panel was formed according to the procedure described in Example I, except for the following details. The fibrous layer was a 0.016" thick 18 x 14 mesh vinyl coated glass fiber screening (Fiberglas screening from Owens-Corning Fiberglas Corp.). The core mix was made up of three volumes of perlite aggregate and 1 part of air entraining type Portland cement; the bonding agent slurry contained 1 volume of Amlite (minus 25 mesh) and 1 volume of Portland cement. Strength was adequate to permit handling and use as a building panel, although the core was not as strong as with an Amlite core. The panel was commercially satisfactory.

This panel was quite light weight; a section showed a specific gravity of 1.2 (75 lbs./cu. ft.). The core had a unit weight of 44 lbs./cu. ft. and the bonding agent had a unit weight of 125 lbs./cu. ft., all values being after curing at least 28 days.

Example VI

The panel produced was the same as that in Example V., except that the core mix comprised 1½ volumes of perlite 1½ volumes of Amlite aggregate and 1 volume of air entraining type Portland cement, and the bonding agent comprised 1 volume of fine sand (minus 35 mesh) 1 volume of Portland cement. Unit weights after curing were: panel, 88 lbs./cu. ft.; core, 75 lbs./cu. ft., and bonding agent 131 lbs./cu. ft. Quality of the panel was good. By replacing 50% of the perlite with Amlite, a stronger sounder panel was obtained but with some increase in weight over the panel in Example V.

Example VII

The panel produced was the same as that in Example V, except that the core mix comprised 3 volumes of Amlite aggregate and 1 volume of air entraining type Portland cement, and the bonding agent comprised neat Portland cement with no aggregate. Unit weights after curing were: panel, 116 lbs./cu. ft.; core, 108 lbs./cu. ft., and bonding agent, 199 lbs./cu. ft. The panel was strong though still somewhat flexible (as were also the panels of Examples V and VI). However, the weight increased further.

Example VIII

The panel produced was the same as that in Example V except that the core mix comprised 1 volume of perlite, 6 volumes of Amlite and 4 volumes of air entraining type Portland cement, while the bonding agent comprised 1 volume of fine Amlite and 1 volume of air entraining Portland cement. Unit weights were, panel, 106 lbs./cu. ft. (sp. gr. 1.7), core, 100 lbs./cu. ft., and bonding agent, 125 lbs./cu. ft.

In making up the bonding agent, the amount of water required will vary depending upon whether fine aggregate is added, and its condition. With straight Portland cement about ½ volume of water is used for each volume of cement; with mixtures of fine aggregate and cement somewhat more water may be required to impart proper flow properties.

The aggregates suitable for my invention are those normally used for lightweight concrete. The lightweight aggregates include materials such as the expanded cellular blast furnace slag, perlite and other volcanic glasses, expanded vermiculite, pumice, diatomaceous earth and expanded shale. Perlite and vermiculite do not afford the structural strength that some of the other lightweight aggregates produce. Expanded shale is not as desirable because the panel cannot be readily cut or nailed. Sand and gravel, while usable in a small degree, are not as desirable because the precast panel cannot be nailed without breaking, cannot be sawed easily, and the weight is increased tending to make the panels too heavy for many purposes.

The cements used for forming the concrete are of the hydraulic type. Conventional Portland cements of the various types, high-early cements, alumina cements, natural and possolanic cements, cements containing air entraining agents such as the resin derivative sold under the name "Vinsol" and the thin set cements developed by the Tile Council of America, are typical.

The material used for the reinforcing membrane is a high strength, low moisture pick-up fiber. Examples of materials which I have used are woven glass fiber mesh (Fiberglas brand screening made by Owens-Corning Fiberglas Corp.), glass fiber scrim, nylon mesh, polyester fiber (Dacron brand sold by Du Pont) mesh, and saran (vinylidene chloride resin). Other suitable synthetic fibers are the modacrylic, polyethylene, polypropylene and fluorocarbon fibers. Metallic fibers can also be used such as aluminum or steel, where strand size permits suitable flexibility and strength. These fibers are characterized as being non-water-susceptible, that is, haaving a low water absorption and being substantially unaffected by water and moist conditions, and retaining a substantial portion of its strength.

Non-woven reinforcing membranes can also be used; these include sheets, mats or webs of random laid glass fibers, metallic fibers or synthetic fibers, having sufficient porosity or openness, i.e., perviousness, to permit penetration of the bonding agent through the membrane. The membranes must not only have good tensile strength, with fiber strength of at least 30,000 p.s.i., but must withstand compression, as where a panel is flexed setting up both tension and compression forces.

Where a woven fabric is employed the mesh size can vary, starting with the 4 x 4 where strand size is heavy. However, a 4 x 4 scrim is not desirable because it is too flimsy and the panel strength borders on the unacceptable side. It is preferred to use at least 7 x 7 mesh. The finer meshes, such as 18 x 14 and above, are better, adding more strength, although they increase the cost somewhat. The glass fiber reinforcing material is preferably the continuous yarn type coated with polyvinyl chloride resins, asphalt or other coatings which prevent scratching where fibers cross and the concomitant loss in strength; the coatings also protect the fibers against the alkalinity of the concrete mix. The mesh size is selected according to the strength desired, and also in keeping with the bonding material; the openings should be sufficiently large to facilitate flow of the bonding cement through the material and into good contact with the core.

The bonding material for securing the skin membrane to the core is a hydraulic cement, preferably a Portland cement or a modified Portland cement such as the thin set type described in No. 2,820,713 and those formed by mixing Portland cement with the butadiene-styrene latex, for example, that sold under the brand name "Laticrete" by the Naugatuck Chemical Division of U.S. Rubber Co. Neat Portland cement gives the best results although it may be desirable in some cases to add a very fine aggregate in order to reduce the cost. Very fine lightweight aggregate (minus 16 sieve, or finer) is desired. Similarly other aggregate fines, including sand, can be used. While the examples describe the bonding of the reinforcing membrane to the core at the time the core is formed, as a convenient method of operation, the membrane can also be applied as a separate step. The core can be formed by casting in a form or by extrusion, cured or partially cured, as on a conveyor, and the membrane then applied with a suitable bonding agent.

In particular I have found that a reinforcing skin of glass fiber bonded to the two major faces of the core with a Portland cement mortar has special properties. The resultant precast panel has unusual strength yet is flexible to permit accommodation to studding that is not perfectly in line, the surface layers of the panel adhere strongly without cracking or flaking, the panel is not adversely affected by water and more likely is improved by moisture, it forms a strong member for use as the surface itself as well as a both indoor and outdoor base, and is completely mildew resistant. The glass fiber, Portland cement, and aggregate become an integral, monolithic structure of low cost, yet high strength. It has previously been proposed to utilize glass fibers in panels, as in U.S. Patent No. 2,712,512. However, in the prior art large amounts of glass fiber have been required. The glass fiber moreover is the most expensive constituent, since, as 18 x 14 woven mesh, it costs in the neighborhood of $1.20 per pound, against $0.01 to $0.02 per pound for Portland cement.

I have found that by employing the reinforcing membrane immediately at the surface, only a small amount of reinforcing material is required. From 1% to 2% by weight of woven glass fiber mesh in a panel will impart more than sufficient strength to produce strong wall structures and to permit handling without cracking or breaking. For certain purposes, where a coarse mesh, such as 8 x 8 will afford the necessary flexibility and strength, less than one percent of glass fiber on the total weight of the panel is employed. With the finer meshes such as 18 x 14, the percent by weight is about 2%. Similarly with other reinforcing non-woven membranes and meshes, for example "Dacron" mesh, less than three percent by weight of the panel is required.

The panels of this invention are suitable for use as curtain walls since, in addition to being strong and lightweight, they do not transmit moisture and have very low moisture pickup. Thus, they are not adversely affected by cold weather and freezing. They permit the application of ceramic tile for exterior finishes as well as for interior.

Wherefore, I claim:

1. A nailable, structural panel particularly adapted for use in areas of exposure to moisture, said panel comprising
 a central core of substantial length and width comprised throughout its thickness of inorganic lightweight aggregate and hydraulic cement, said core being characterized by the presence of a multiplicity of voids and cells which confer on the core an average unit weight not substantially exceeding 130 pounds per cubic foot,
 a layer of high tensile strength fibrous material disposed closely adjacent the core at the two opposed faces thereof
 and a layer of bonding material consisting of at least 50% hydraulic cement, said layer being substantially thinner than said core, relatively low in voids and of high unit weight relative to said core and at least partially penetrating the voids and filling the surface irregularities at the face of said core thereby bonding the respective fibrous layers to the opposed surfaces of the core to form an integral structure.

2. A five layered nailable panel structure comprising two layers of glass fiber spaced apart
 a concrete core member extending between two said layers of glass fiber, consisting of lightweight aggregate and hydraulic cement, the ratio of aggregate to cement being at least 2:1, said core having present therein a substantial number of voids and
 two layers of bonding agent containing at least 50% hydraulic cement and being low in voids, extending from the facial boundary of each of the two major faces of said core member to and through the openings in each of said respective layers of glass fiber to firmly bond said layers of glass fiber to said core to form an integral panel structure.

3. A nailable panel comprising a sandwich structure of a core of hydraulic cement and lightweight aggregate of substantial thickness said core slab being non-self-supporting and having a unit weight of less than 110 pounds per cubic foot,
 a layer of high-strength non-water-susceptible fibrous material on each of the opposed faces of said core, and a comparatively thin layer of bonding material containing at least 50% hydraulic cement extending from the boundary surface of said core through and effectively filling the openings in said fibrous layer, firmly bonding said fibrous layer to said core said structure being self supporting.

4. A nailable structural concrete panel comprising a core of inorganic light weight aggregate and Portland cement, the ratio of aggregate to cement being at least 2:1, said core being non-self-supporting,
 a layer of glass fibers disposed immediately adjacent said core respectively at each of the two major faces thereof, and
 on each face a layer of bonding material consisting of at least 50% Portland cement penetrating said fibrous layer and the surface of said core to firmly bond the glass fibers and core
said panel being relatively light weight and self supporting.

5. The product of claim 1 wherein the layer of hydraulic cement on one side of said panel is thicker than the layer on the opposite side.

6. A precast nailable structural panel adapted for use in areas of substantial moisture exposure comprising a slab-like low unit weight core of Portland cement and lightweight aggregate, and a reinforcing surface skin of glass fiber firmly bonded to each of the two opposed major surfaces by means of a thin mortar layer containing at least 50% Portland cement and being of relatively high unit weight, said layer penetrating the surface of said core and openings in said skin of glass fiber.

7. A nailable structural panel particularly adapted for use in areas of exposures to moisture comprising a central core structure of substantial length and width comprised of an inorganic aggregate material and hydraulic cement in stable dimensional form yet generally incapable of remaining self-sustaining during physical handling, and a surface skin capable of resisting tension and compression loads, said surface skin including a high strentgh flexible, moisture-resistant fibrous membrane affixed to the surfaces of the core by a bonding agent whereby said panel is rendered self-sustaining.

8. A nailable structural building panel of substantial length and width and being thin in relation to its length and width, said panel comprising
 a central core of hydraulic cement and lightweight aggregate, said core, per se, having a unit weight not substantially exceeding approximately 120 to 130 pounds per cubic foot,
 and a thin layer of glass fiber fabric cemented to and integrated with each face of said core by hydraulic cement extending through the openings of said glass fiber fabric, the said hydraulic cement having a substantially higher density than that of said core but including the thickness of said glass fiber fabric, having a total thickness substantially less than the thickness of said core.

9. A nailable structural building panel of substantial length and width and being thin in relation to its length and width, said panel comprising
 a central core of hydraulic cement and lightweight aggregate, said core, per se, having a unit weight not substantially exceeding approximately 120 to 130 pounds per cubic foot,
 and a thin layer of glass fiber fabric cemented to and integrated with each face of said core by hydraulic cement extending through the openings of said glass fiber fabric, the said hydraulic cement having a substantially higher density than that of said core but, including the thickness of said glass fiber fabric, having a total thickness substantially less than the thickness of said core, said hydraulic cement being thicker at one side of said core than at the other.

10. A monolithic multiple-ply nailable structural building panel in which the sole cementitious bonding agent is hydraulic cement
 the central portion comprising lightweight aggregate and hydraulic cement and having voids and cells therein conferring upon it a unit weight no exceeding 120 to 130 pounds per cubic foot the outer surfaces of said central core being bounded by high-tensile strength mesh fabric, said fabric being bonded to the central core by hydraulic cement extending into the openings of said fabric.

References Cited by the Examiner

UNITED STATES PATENTS

| | | | |
|---|---|---|---|
| 1,439,954 | 12/1922 | Emerson | 52—600 X |
| 1,701,454 | 2/1929 | Knowlton | 52—384 |
| 2,252,980 | 8/1941 | Rhelt | 52—368 |
| 2,995,784 | 8/1961 | Driscoll | 52—309 X |
| 3,047,442 | 7/1962 | Bozzacco | 161—93 X |

FOREIGN PATENTS

| | | |
|---|---|---|
| 138,616 | 9/1950 | Australia. |
| 469,822 | 12/1950 | Canada. |

OTHER REFERENCES

Collins, F. Thomas: Precast Concrete Sandwich Panels for Tilt-up Construction, Journal of The American Concrete Institute, October 1954, pp. 149–164.

FRANK L. ABBOTT, *Primary Examiner.*

RICHARD W. COOKE, JR., *Examiner.*

A. C. PERHAM, *Assistant Examiner.*